(12) United States Patent
Ishigaki et al.

(10) Patent No.: US 11,325,427 B2
(45) Date of Patent: May 10, 2022

(54) TIRE

(71) Applicant: SUMITOMO RUBBER INDUSTRIES, LTD., Hyogo (JP)

(72) Inventors: Yuichi Ishigaki, Kobe (JP); Tetsuya Sakaguchi, Kobe (JP); Hiroshi Fujita, Kobe (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 199 days.

(21) Appl. No.: 16/534,018

(22) Filed: Aug. 7, 2019

(65) Prior Publication Data
US 2020/0062043 A1 Feb. 27, 2020

(30) Foreign Application Priority Data

Aug. 23, 2018 (JP) .............................. JP2018-156589

(51) Int. Cl.
*B60C 13/00* (2006.01)
(52) U.S. Cl.
CPC .................................. *B60C 13/001* (2013.01)
(58) Field of Classification Search
CPC ........ B60C 13/001; B60C 13/00; B60C 13/02
USPC ........................................................ 152/523
See application file for complete search history.

(56) References Cited

U.S. PATENT DOCUMENTS

| 2009/0218019 | A1 | 9/2009 | Paturle | |
|---|---|---|---|---|
| 2012/0199261 | A1* | 8/2012 | Yamakawa | B60C 13/001 |
| | | | | 152/523 |
| 2014/0166177 | A1* | 6/2014 | Muhlhoff | B60C 13/001 |
| | | | | 152/523 |

FOREIGN PATENT DOCUMENTS

| JP | H11321242 | A | * | 11/1999 | | |
|---|---|---|---|---|---|---|
| JP | 2009-512584 | | | 3/2009 | | |
| JP | 2009143488 | A | * | 7/2009 | ........... | B60C 13/001 |
| JP | 2010052471 | A | * | 3/2010 | ............. | B60C 13/02 |
| WO | WO-2016015898 | A1 | * | 2/2016 | ........... | B60C 13/001 |

OTHER PUBLICATIONS

JP 2009143488 Machine Translation; Tomita, Shintaro (Year: 2009).*
JP 2010052471 Machine Translation; Fujioka, Takashi (Year: 2010).*
WO 2016015898 Machine Translation; Behr, Ulrich (Year: 2016).*
JP H11321242 Machine Translation, Itabashi, Shinobu (Year: 1999).*

* cited by examiner

*Primary Examiner* — Katelyn W Smith
*Assistant Examiner* — Nicholas J Weiler
(74) *Attorney, Agent, or Firm* — Greenblum & Bernstein, P.L.C.

(57) ABSTRACT

A tire has an outer surface comprising a decorative portion which is visible and provided with micro-protuberances at a density of from 2 to 10 micro-protuberances per 1 sq.mm, and the micro-protuberances include a recessed micro-protuberance provided at its top surface with a recess.

20 Claims, 6 Drawing Sheets

TIRE

TECHNICAL FIELD

The present invention relates to a tire of which outer surface is provided with a decorative portion.

BACKGROUND ART

Patent Document 1 below discloses a tire in which an outer surface of a sidewall portion is provided with a pattern comprising a plurality of tiny tufts having an average cross sectional area between 0.003 and 0.06 sq.mm. Thereby, in the visibility, the contrast between the part provided with such pattern and a part without the pattern is increased. As a result, the visibility of, for example, a brand name of a tire which is formed by the part without the pattern may be improved.

Patent Document 1: Japanese Patent Application Publication No. 2009-512584

SUMMARY OF THE INVENTION

Problems to be Solved by the Invention

In recent years, on the other hand, in order to further improve the visibility of a brand name and the like of a tire formed in the tire sidewall portion, it is desired to further enhance the contrast between the foreground such as manufacturer name, product or brand name, size, etc. of the tire and the background.

The present invention was made in view of the above-described actual situation, and an object of the present invention is to provide a tire of which outer surface is provided with a decorative portion as a background of a foreground capable of improving the visibility the foreground by enhancing the contrast therebetween.

According to the present invention, a tire has an outer surface comprising a decorative portion which is visible and provided with micro-protuberances at a density of from 2 to 10 micro-protuberances per 1 sq.mm, and the micro-protuberances include a recessed micro-protuberance provided in its top surface with a recess.

Therefore, in the tire according to the present invention, on the premise that the outer surface of the tire is black and a great majority of the micro-protuberances have such recesses, the reflection of the light irradiated to the micro-protuberances is reduced by the recesses, so the decorative portion appears darker (blacker). Therefore, the contrast between the decorative portion as a background and a non-decorative portion as a foreground is increased, and the visibility of, for example, brand name and the like formed by the non-decorative portion can be improved.

In the tire according to the present invention, it is preferable that the depth of the recess is not less than 15% of the protruding height of the recessed micro-protuberance.

It is preferable that each of the micro-protuberances has a circular or elliptical shape in the cross-section of the micro-protuberance perpendicular to a direction of the protruding height.

It is preferable that the shape in the cross-section of the micro-protuberance perpendicular to the direction of the protruding height becomes smaller on the top surface side than the root side of the micro-protuberance.

It is preferable that each of the micro-protuberances comprises a portion where the area of the shape in the cross-section continuously decreases toward the top surface.

It is preferable that each of the micro-protuberances comprises a portion where the area of the shape in the cross-section decreases stepwise toward the top surface.

It is preferable that, in the above-said cross-section, the recess has a circular or elliptical cross-sectional shape.

It is preferable that the cross-sectional shape of the recess in the above-said cross-section is larger on the top surface side than the root side of the micro-protuberance.

It is preferable that the recess comprises a portion where the area of its shape in the above-said cross-section continuously increase toward the top surface.

It is preferable that the recess comprises a portion where the area of its shape in the above-said cross-section increase stepwise toward the top surface.

It is preferable that the arrangement pitches of the micro-protuberances are 0.6 to 1.0 mm.

It is preferable that the top surface of the micro-protuberance is flat or outwardly convex hemispherical.

It is preferable that a part of the decorative portion excepting the micro-protuberances includes a roughened part whose ten-point average roughness (Rz) is 0.01 to 0.05 mm.

It is preferable that the width between the outer edge of the top surface and the recess is not more than 0.20 mm.

It is preferable that the maximum diameter of the top surface is 0.25 to 0.65 mm.

It is preferable that the maximum diameter of the micro-protuberances is 0.30 to 0.70 mm, and the protruding height of the micro-protuberances is 0.15 to 0.50 mm.

It is preferable that the depth of the recess is not more than the protruding height of the micro-protuberances, and the maximum diameter of the recess is 0.10 to 0.50 mm.

DESCRIPTION OF THE PREFERRED EMBODIMENTS

Figure 1:
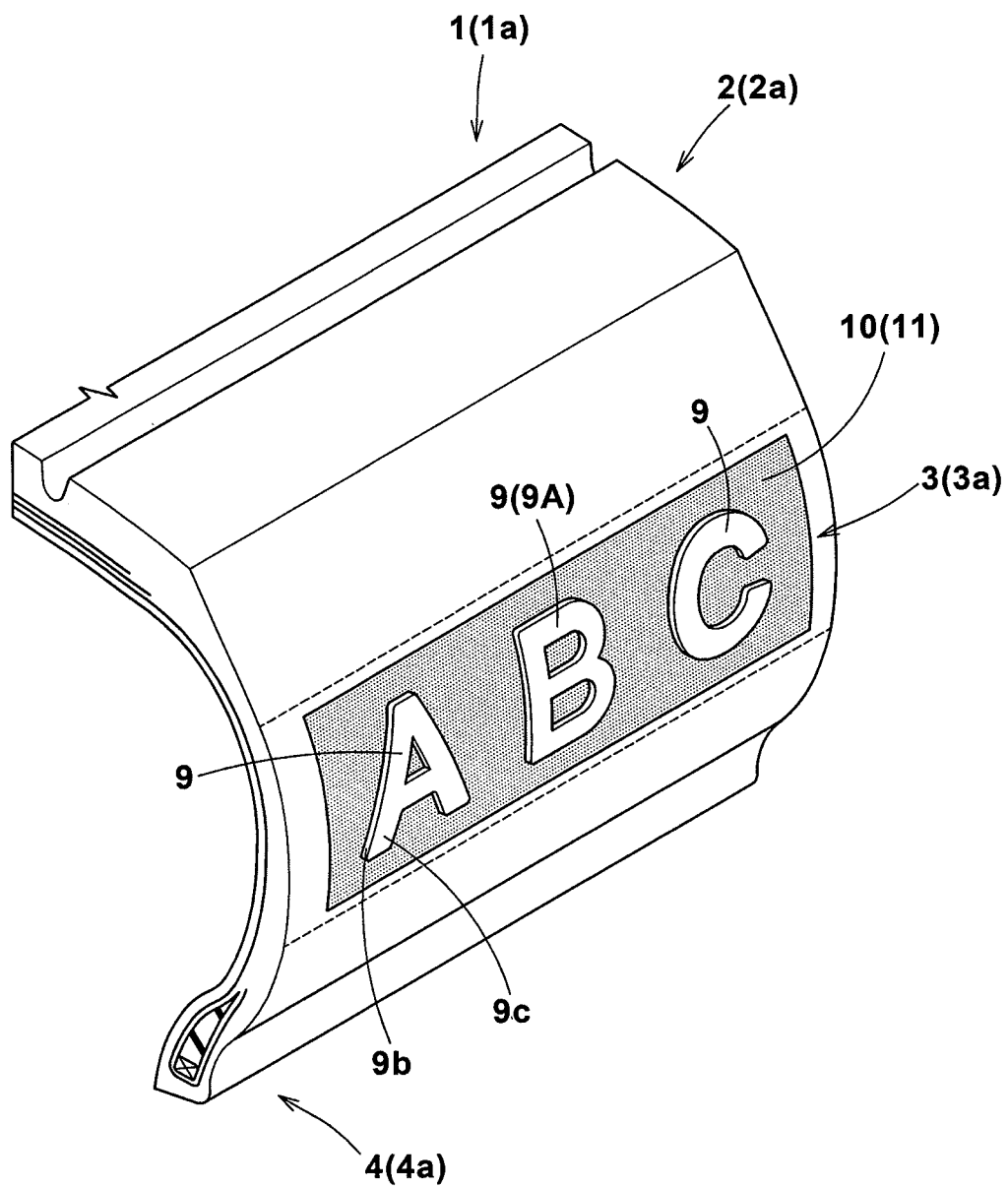
FIG. 1 is a perspective view showing a part of a tire according to the present invention.

The present invention is suitably applied to pneumatic tires for passenger cars, motorcycles, heavy vehicles such as truck and bus and so on.

Taking a passenger car tire as an example, embodiments of the present invention will now be described in detail in conjunction with accompanying drawings.

In the drawings, tire 1 according to the present invention is a pneumatic tire 1 for passenger cars.

As well known, a pneumatic tire comprises a tread portion 2 whose outer surface defines the tread (2*a*), a pair of axially spaced bead portions 4 mounted on rim seats, a pair of sidewall portions 3 extending between the tread edges and the bead portions 4, a carcass extending between the bead portions through the tread portion and the sidewall portions, and a tread reinforcing belt disposed radially outside the carcass in the tread portion 2.

The tire 1 has an outer surface 1*a* which is defined as being visible from the outside of the tire even when the tire 1 is mounted on a rim (not shown).

The outer surface 1a includes the outer surface 2a of the tread portion 2 (namely tread), the outer surface 3a of each said sidewall portion 3, and the outer surface 4a of each said bead portion 4.

The outer surface 1a comprises a non-decorative portion 9 and a decorative portion 10.

In the present embodiment, a plurality of the non-decorative portions 9 are formed in the decorative portion 10 as their background.

In the present embodiment, the non-decorative portions 9 and the decorative portion 10 are formed in the outer surface 3a of at least one of the sidewall portions 3.

However, these portions 9 and 10 may be formed in the outer surface 2a of the tread portion 2 or the outer surface 4a of the bead portions 4.

In the present embodiment, the non-decorative portion 9 is formed as a raised portion 9A which is raised from the outer surface 1a or 3a. The raised portion 9A has a top surface 9c, and a side surface 9b extending from the edge of the top surface 9c to the outer surface 1a or 3a so as to surround the raised portion 9A. The top surface 9c is formed by a smooth surface. Thus, the top surface 9c can reflect the light and makes the non-decorative portion 9 be lustrous.

The non-decorative portion 9 is formed as a mark, for example, which is each character, each symbol, etc. used to represent the manufacturer name, the product name, the size, etc. of the tire 1.

The decorative portion 10 is a portion provided with a plurality of micro-protuberances 11.

The micro-protuberances 11 are arranged densely, for example, at a density of 2 to 10 micro-protuberances per 1 sq.mm. when the light is irradiated to the surfaces of the micro-protuberances 11, the light is diffusely reflected in a preferable manner, and the decorative portion 10 looks matte black. Thereby, the contrast between the non-decorative portion 9 and the decorative portion 10 is increased, and the visibility of the non-decorative portion 9 or the mark is improved.

Figure 2:
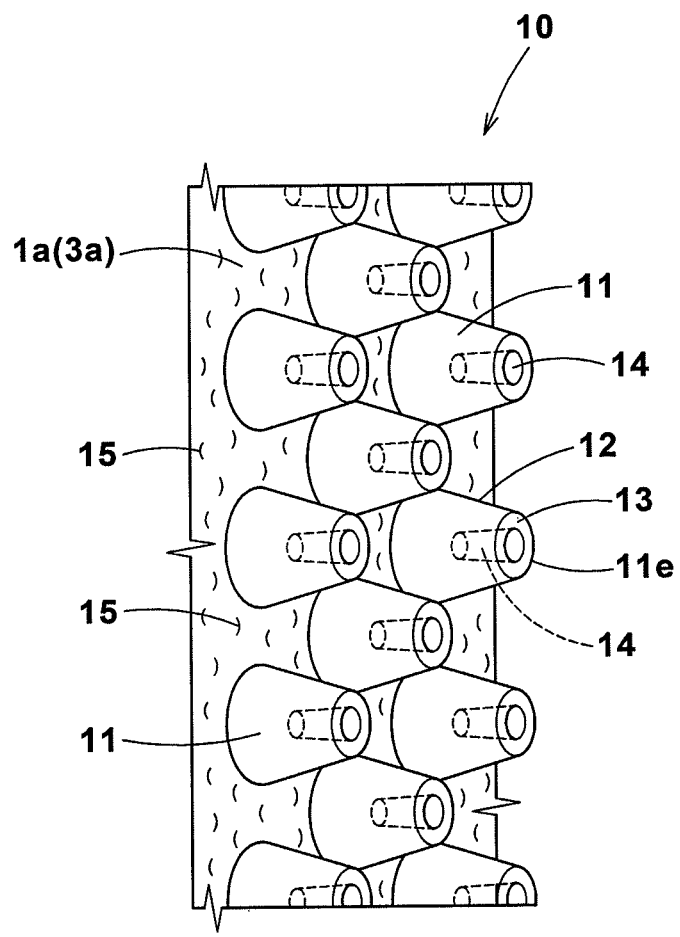
FIG. 2 is an enlarged perspective view showing a part of the decorative portion of FIG. 1.

FIG. 2 is an enlarged perspective view of a part of the decorative portion 10 of FIG. 1.

In this example, each micro-protuberance 11 comprises a side surface 12 which extends outward from the outer surface 1a or 3a, and a top surface 13 which is continuous with the side surface 12.

In this example, the side surface 12 and the top surface 13 are delimited by a clear edge 11e caused by their different angles with respect to the outer surface 3a.

In this example, along the edge 11e, the angle formed between the side surface 12 and the top surface 13 is constant. But, it is also possible that the angle is variable, for example continuously changed, along the edge 11e.

The micro-protuberances 11 include a recessed micro-protuberance.

The recessed micro-protuberance is provided in its top surface 13 with a recess 14. By the presence of the recess 14, the reflection of the light irradiated to the top surface 13 is reduced, and the decorative portion 10 looks more matte black. Therefore, the contrast is increased, and the visibility may be further improved.

Figure 3:
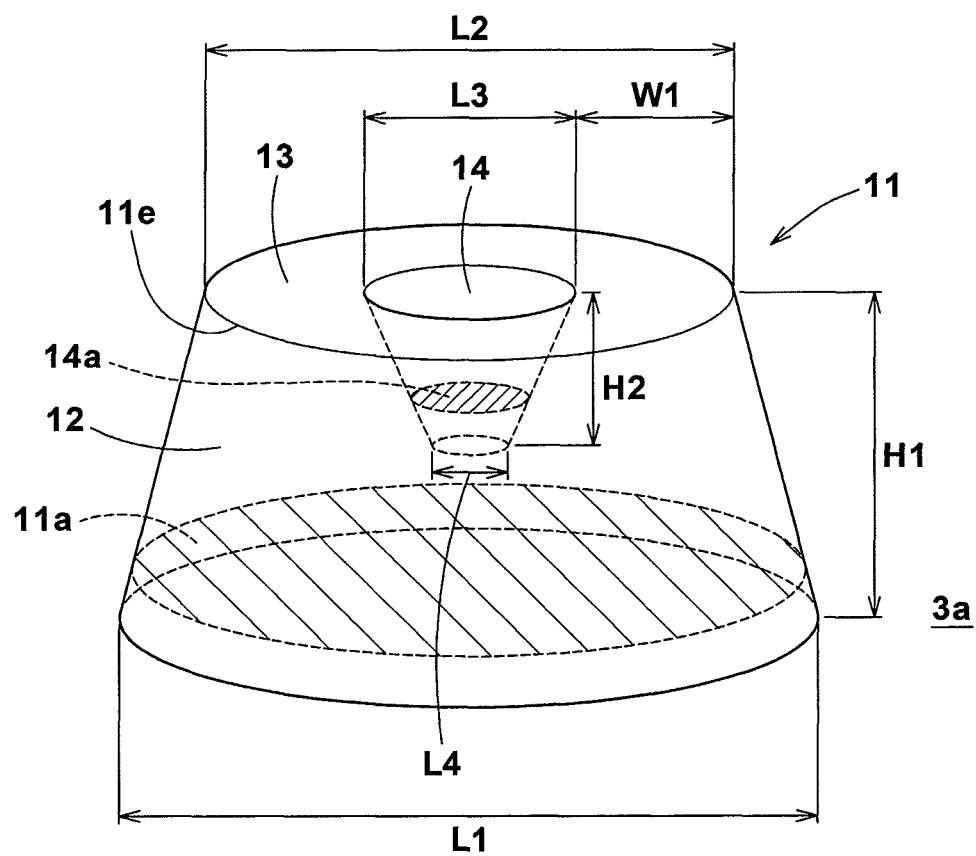
FIG. 3 is an enlarged perspective view showing one of the micro-protuberances of FIG. 2.

FIG. 3 is a perspective view of the micro-protuberance 11. As shown, in a cross section of the micro-protuberance 11 perpendicular to the direction of the protruding height H1 the micro-protuberance 11 has a shape 11a which is, in this embodiment, circular or elliptical.

The micro-protuberances 11 having such cross sectional shapes help to create a dark matte look surface irrespective of the irradiation direction of the light.

In the micro-protuberances 11 in this example, the cross-sectional shape 11a is smaller on the side of the top surface 13 than on the side of the root of the micro-protuberance. Incidentally, the side of the root refers to the outer surface 3a side of the micro-protuberance 11.

Such micro-protuberance 11 can be prevented from chipping and cracking, therefore, the improved visibility may be ensured for a long time.

In this example, the cross-sectional shape 11a of the micro-protuberance 11 gradually decreases in its area from the root side toward the top surface 13. Specifically, the micro-protuberance 11 is tapered from the root side to the top surface 13. The micro-protuberance 11 is however not limited to such configuration.

When the maximum diameter L1 of the micro-protuberance 11 is less than 0.30 mm, the micro-protuberance 11 becomes insufficient rigidity, and there is a possibility that cracking or chipping-off may easily occur.

When the maximum diameter L1 of the micro-protuberance 11 is more than 0.7 mm, there is a possibility that the reflection of the light from the side surface 12 is increased, and the above-mentioned contrast between the non-decorative portion 9 and the decorative portion 10 is decreased.

Thus, it is preferable that the maximum diameter L1 is set in a range from 0.30 to 0.70 mm in order to secure the dark matte look.

In order to effectively derive such advantageous effect, the protruding heights H1 of the micro-protuberances 11 are preferably set in a range from 0.15 to 0.50 mm.

It is preferable that the top surface 13 is a flat surface or a part of an outwardly convex hemispherical surface in view of the prevention of damages such as cracking and chipping-off. In the present embodiment, a flat surface is adopted.

When the width W1 between the outer edge 11e of the top surface 13 and the recess 14 is more than 0.20 mm, the area of the recess 14 is reduced, and the effect of the micro-protuberances 11 to make the decorative portion 10 matte black may be reduced when the width W1 is smaller than 0.05 mm, there is a possibility that cracking or chipping-off easily occurs. Therefore, the width W1 is preferably not less than 0.05 mm, and preferably not more than 0.20 mm.

In order to effectively exert the effect to make the decorative portion 10 matte black, it is preferred that the maximum diameter L2 of the top surface 13 is not less than 0.25 mm but not more than 0.65 mm.

The recess 14 has, in its cross section perpendicular to its depth direction, a cross sectional shape 14a which is preferably circular or elliptical in view of the rigidity of the micro-protuberance 11 and the effect to make the decorative portion 10 more matte in every direction. In the present embodiment, the cross sectional shape 14a is circular.

In the present embodiment, the recess 14 comprises a portion in the depth direction in which the cross sectional shape 14a becomes gradually larger toward the top surface 13. In this example, the cross sectional shape 14a becomes larger continuously from the bottom of the recess 14 to the top surface 13 in order to make it easy for dust in the recess 14 to self-eject therefrom. However, the recess 14 is not limited to such configuration.

Preferably, the depth H2 of the recess 14 is not less than 15% of the protruding height H1 of the micro-protuberance 11 in order to reduces the reflection of light from the recess 14 and thereby to make the decorative portion 10 more matte black effectively.

The depth H2 of the recess 14 is preferably not more than 100%, more preferably not more than 90% of the protruding height H1 of the micro-protuberance 11 in order to secure rigidity for the micro-protuberance 11 and also in view of the effect to increase the contrast between the non-decorative portion 9 and the decorative portion 10.

The maximum diameter L3 of the recess 14 is preferably not less than 0.10 mm and not more than 0.50 mm. If the maximum diameter L3 is less than 0.10 mm, the effect to make the top surface 13 be not lustrous may be reduced. If the maximum diameter L3 is more than 0.50 mm, the rigidity of the micro-protuberance 11 may become insufficient.

The minimum diameter L4 of the recess 14 is preferably not more than 0.45 mm. In this example, the minimum diameter L4 occurs at the bottom of the recess 14.

It is preferable that, as shown in FIG. 2, a part of the decorative portion 10 excepting the micro-protuberances 11 (in other words, a part of the outer surface 1a in the decorative portion 10) includes a roughened part 15 whose ten-point average roughness (Rz) is 0.01 to 0.05 mm in order to make the decorative portion 10 more matte black. The ten-point average roughness (Rz) is measured in accordance with Japanese Industrial standard (JIS) 80601 (1994). Such roughened part 15 may also help to increase the surface rigidity of the decorative portion 10 to suppress the chipping-off of the micro-protuberances 11.

It is preferable that the micro-protuberances 11 are disposed in an area of not less than 50%, more preferably not less than 75%, most preferably 100% of the decorative portion 10. In the above-said area, the arrangement pitches of the micro-protuberances 11 are preferably set in a range from 0.6 to 1.0 mm when measured between the centers of the micro-protuberances 11.

When the micro-protuberances 11 having a constant size are densely arranged, the decorative portion 10 looks darker so the contrast becomes clear on the other hand, when the sizes and the arrangement of the micro-protuberances 11 are made random, there is an advantage such that the damaged portion such as cracks or chip-off becomes inconspicuous as compared with the above case.

The decorative portion 10 is made of the same rubber as the rubber member of the tire 1 forming the outer surface 3a.

As to the method of forming the decorative portion 10, the micro-protuberances 11 may be formed during vulcanization molding the tire 1 by using a tire vulcanizing mold of which inner surface is provided with a negative mold pattern of the micro-protuberances 11.

Further, as another method, for example, computer control machining or laser processing on the outer surface of the vulcanized tire 1 may be employed.

Figure 4:
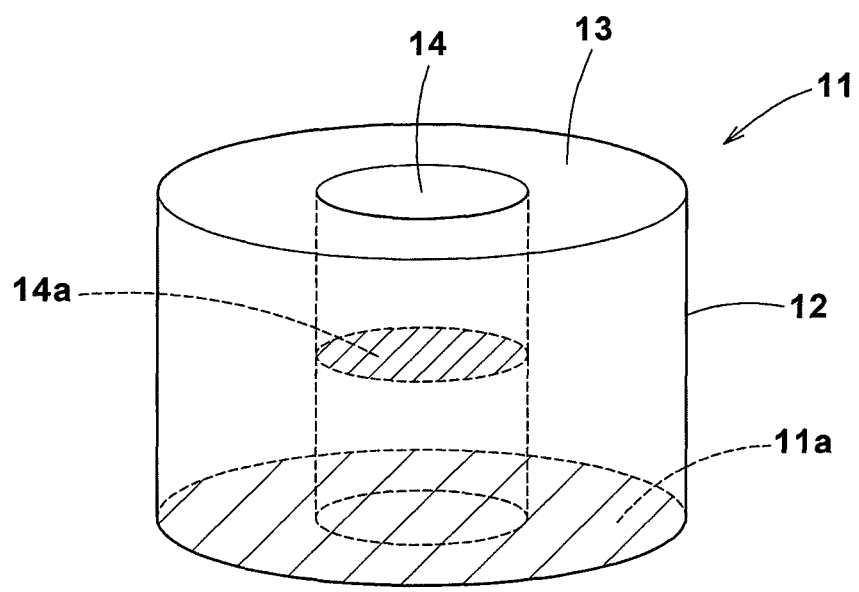
FIGS. 4, 5 and 6 are enlarged perspective views each showing another example of the micro-protuberance.

FIG. 4 shows another example of the micro-protuberance 11 for another embodiment of the present invention. In this embodiment, the micro-protuberance 11 is formed in a cylindrical shape having a same cross-sectional shape 11a from the top surface 13 to the root of the micro-protuberance 11. Further, the recess 14 has a same cross-sectional shape 14a from the top surface 13 to the bottom of the recess, that is, the recess 14 has a cylindrical shape. Specifications other than the above of the micro-protuberance 11 and the tire 1 may be the same as the former embodiment.

Figure 5:
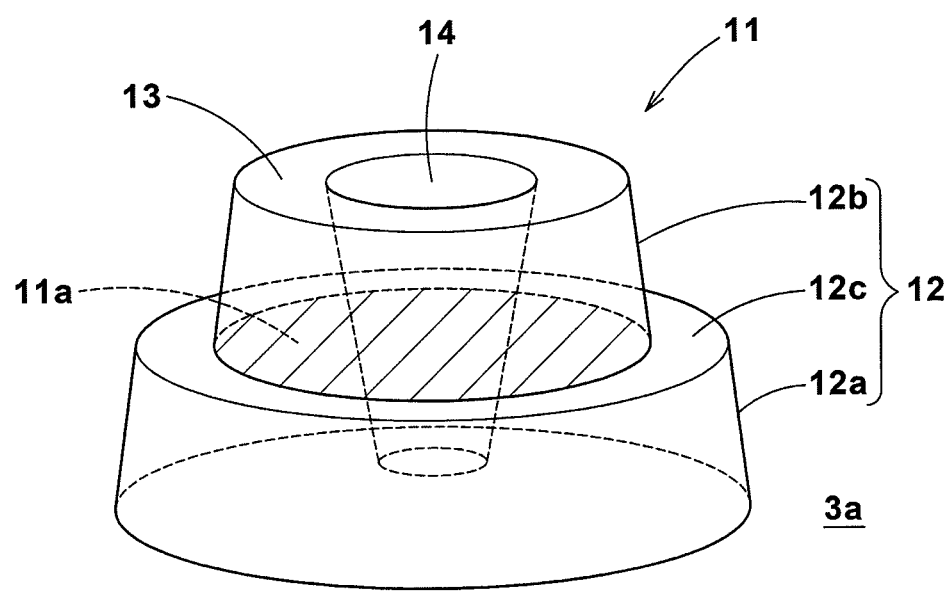

FIG. 5 shows still another example of the micro-protuberance 11 for still another embodiment of the present invention.

In this embodiment, the side surface 12 of the micro-protuberance 11 is made up of a first portion 12a extending outwardly from the outer surface 3a or 1a in a tapered manner, a second portion 12b extending inwardly from the outer edge of the top surface 13 in an inverse tapered manner, and a third portion 12c extending perpendicularly to the direction of the protruding height and connecting between the first portion 12a and the second portion 12b.

As a result, the diameter of the micro-protuberance 11 makes a stepwise change at the position of the third portion 12c, otherwise, the diameter is continuously decreased from the root side toward the top surface side in each of the first and second portions 12a and 12b.

The recess 14 is tapered from the top surface 13 to its bottom specifications other than the above of the micro-protuberance 11 and the tire 1 may be the same as the first embodiment.

Figure 6:
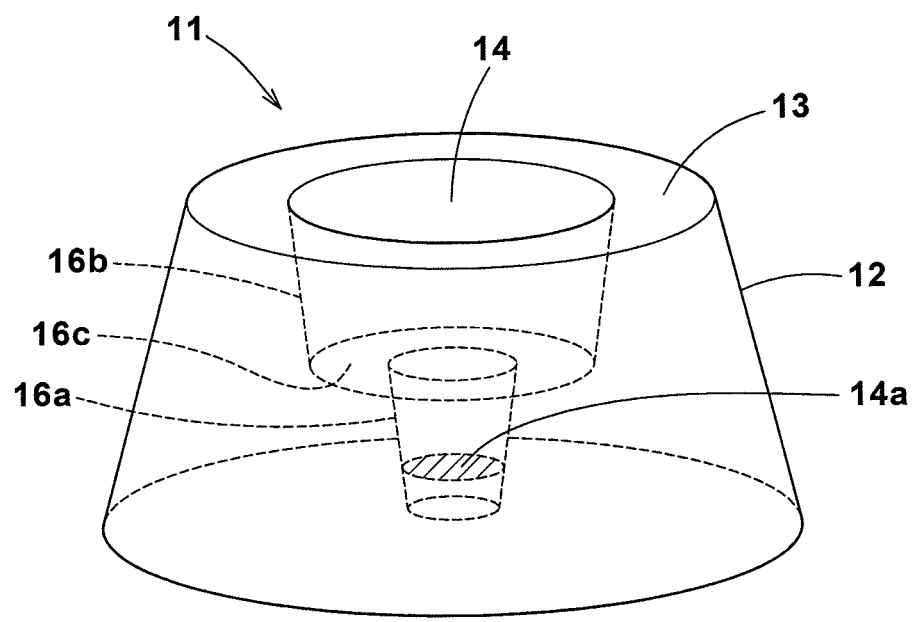

FIG. 6 shows yet still another example of the micro-protuberance 11 for yet still another embodiment of the present invention.

In this embodiment, the recess 14 is composed of an inner portion 16a and an outer portion 16b. The outer portion 16b extends inwardly from the top surface 13 in an inverse tapered manner. The inner portion 16a extends inwardly from the inner end of the outer portion 16b toward the root of the micro-protuberances 11 in an inverse tapered manner.

At the inner end of the outer portion 16b, the diameter of the outer portion 16b is larger than the diameter of the inner portion 16a, therefore, they are connected through a joint surface portion 16c. The joint surface portion 16c is perpendicular to the direction of the protruding height of the micro-protuberance 11.

On the other hand, the side surface 12 of the micro-protuberance 11 is tapered from the root to the top surface 13.

Specifications other than the above of the micro-protuberance 11 and the tire 1 may be the same as the first embodiment.

While detailed description has been made of preferable embodiments of the present invention, the present invention can be embodied in various forms without being limited to the illustrated embodiments.

Comparison Test

In order to confirm the effect of the present invention, pneumatic tires provided in the outer surface of the sidewall portion with a non-decorative portion and a decorative portion as shown in FIGS. 1 and 2 were experimentally manufactured. Then, each tire was tested for the visibility of the non-decorative portion specifications other than those described in Table 1 are the same for both the comparative example and the working example.

<Visibility Test>

Each test tire was visually observed at a position one meter sideways from the test tire, and the observer evaluated the visibility based on the contrast between the decorative portion and the non-decorative portion.

The results are indicated in Table 1 by an index based on comparative example 1 being 100, wherein the larger the value, the better the visibility.

TABLE 1

| Tire | Comparative example 1 | working example 1 |
|---|---|---|
| shape of micro-protuberances | FIG. 3 | FIG. 3 |
| presence or absence of recesses | absence | presence |
| H1 (mm) | 0.25 | 0.25 |
| L1 (mm) | 0.54 | 0.54 |
| L2 (mm) | 0.41 | 0.41 |
| H2 (mm) | — | 0.25 |
| L3 (mm) | — | 0.31 |

TABLE 1-continued

| Tire | Comparative example 1 | working example 1 |
|---|---|---|
| L4 (mm) | — | 0.2 |
| W1 (mm) | — | 0.05 |
| visibility | 100 | 120 |

Arrangement pitches of micro-protuberances: 0.63 mm

As shown in Table 1, the tire of the working example was superior in the visibility to the tire of the comparative example.

DESCRIPTION OF THE REFERENCE SIGNS 1 tire
1a tire outer surface
9 non-decorative portion
10 decorative portion
11 micro-protuberance
13 top surface
14 recess

The invention claimed is:

1. A tire having an outer surface comprising a decorative portion which is visible and provided with micro-protuberances at a density of 2 to 10 micro-protuberances per 1 sq.mm, and the micro-protuberances including a recessed micro-protuberance provided in its top surface with a recess, wherein
a width between an outer edge of the top surface and the recess is not more than 0.20 mm, and
a maximum diameter of the top surface is 0.25 to 0.65 mm.

2. The tire according to claim 1, wherein
a depth of the recess is not less than 15% of a protruding height of the recessed micro-protuberance.

3. The tire according to claim 1, wherein
the micro-protuberances have circular or elliptical shapes in respective cross-sections of the micro-protuberances perpendicular to a direction of a protruding height of the micro-protuberances.

4. The tire according to claim 1, wherein
the micro-protuberances have shapes in respective cross-sections of the micro-protuberances perpendicular to a direction of a protruding height of the micro-protuberances, and the shapes become smaller on the top surface side than a root side of the micro-protuberances.

5. The tire according to claim 4, wherein
each of the micro-protuberances comprises a portion where an area of the shape in the cross-section continuously decreases toward the top surface.

6. The tire according to claim 4, wherein
each of the micro-protuberances comprises a portion where an area of the shape in the cross-section decreases stepwise toward the top surface.

7. The tire according to claim 1, wherein
the recess has a circular or elliptical shape in a cross-section.

8. The tire according to claim 1, wherein
a shape of the recess in a cross-section is larger on a top surface side than a root side of the micro-protuberance.

9. The tire according to claim 8, wherein
the recess comprises a portion where an area of its shape in said cross-section continuously increases toward the top surface.

10. The tire according to claim 8, wherein
the recess comprises a portion where an area of its shape in said cross-section increases stepwise toward the top surface.

11. The tire according to claim 1, wherein
arrangement pitches of the micro-protuberances are 0.6 to 1.0 mm.

12. The tire according to claim 1, wherein
the top surface of the micro-protuberance is flat or outwardly convex hemispherical.

13. The tire according to claim 1, wherein
a part of the decorative portion excepting the micro-protuberances includes a roughened part whose ten-point average roughness (RZ) is 0.01 to 0.05 mm.

14. The tire according to claim 1, wherein
a maximum diameter of the micro-protuberances is 0.30 to 0.70 mm, and
a protruding height of the micro-protuberances is 0.15 to 0.50 mm.

15. The tire according to claim 1, wherein
a depth of the recess is not more than a protruding height of the micro-protuberances, and
a maximum diameter of the recess is 0.10 to 0.50 mm.

16. The tire according to claim 1, wherein
each of the micro-protuberances has a top surface and a side surface, and
the recessed micro-protuberance has the top surface with the recess and the side surface extending from a peripheral edge of the top surface toward a root of the recessed micro-protuberance.

17. The tire according to claim 1, wherein
the micro-protuberances including the recessed micro-protuberance have round shapes in respective cross-sections of the micro-protuberances perpendicular to a direction of a protruding height of the micro-protuberances.

18. A tire having an outer surface comprising a decorative portion which is visible and provided with micro-protuberances at a density of 2 to 10 micro-protuberances per 1 sq.mm, and
the micro-protuberances including a recessed micro-protuberance provided in its top surface with a recess, wherein
the micro-protuberances have shapes in respective cross-sections of the micro-protuberances perpendicular to a direction of a protruding height of the micro-protuberances, and the shapes become smaller on the top surface side than a root side of the micro-protuberances, and wherein
each of the micro-protuberances comprises a portion where an area of the shape in the cross-section decreases stepwise toward the top surface.

19. A tire having an outer surface comprising a decorative portion which is visible and provided with micro-protuberances at a density of 2 to 10 micro-protuberances per 1 sq.mm, and
the micro-protuberances including a recessed micro-protuberance provided in its top surface with a recess, wherein the recess has a circular or elliptical shape in a cross-section.

20. A tire having an outer surface comprising a decorative portion which is visible and provided with micro-protuberances at a density of 2 to 10 micro-protuberances per 1 sq.mm, and
the micro-protuberances including a recessed micro-protuberance provided in its top surface with a recess, wherein a shape of the recess in a cross-section is larger on a top surface side than a root side of the micro-protuberance, and the recess comprises a portion where an area of its shape in said cross-section increases stepwise toward the top surface.

\* \* \* \* \*